United States Patent
Berjot et al.

(10) Patent No.: US 11,643,214 B2
(45) Date of Patent: May 9, 2023

(54) COLD REGULATING VALVE FOR A HEAT EXCHANGER SYSTEM OF AN AIRCRAFT PROPULSION SYSTEM

(71) Applicant: Airbus Operations (S.A.S.), Toulouse (FR)

(72) Inventors: Michael Berjot, Toulouse (FR); Julien Cayssials, Toulouse (FR); Adeline Soulie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 267 days.

(21) Appl. No.: 17/149,289

(22) Filed: Jan. 14, 2021

(65) Prior Publication Data
US 2021/0214089 A1 Jul. 15, 2021

(30) Foreign Application Priority Data
Jan. 15, 2020 (EP) .................................. 20151978

(51) Int. Cl.
*B64D 13/00* (2006.01)
*B64D 13/06* (2006.01)
(Continued)

(52) U.S. Cl.
CPC ...... *B64D 13/00* (2013.01); *B64D 2013/0618* (2013.01); *F16K 1/2021* (2013.01); *F16K 1/223* (2013.01); *F16K 31/521* (2013.01)

(58) Field of Classification Search
CPC . F16K 1/16; F16K 1/18; F16K 1/2021; F16K 31/16; F16K 31/52; F16K 31/528;
(Continued)

(56) References Cited

U.S. PATENT DOCUMENTS 2,621,579 A * 12/1952 Person .................. F24F 13/062
454/325
3,346,013 A * 10/1967 Reichow .................. F24F 11/74
137/601.11
(Continued)

FOREIGN PATENT DOCUMENTS

EP 0469825 A2 2/1992
EP 1944475 A2 7/2008
(Continued)

OTHER PUBLICATIONS

European Search Report for Application No. 20151978.2 dated Jul. 10, 2020.

*Primary Examiner* — Craig J Price
(74) *Attorney, Agent, or Firm* — KDW Firm PLLC

(57) ABSTRACT

A cold regulating valve for a heat exchanger system of an aircraft propulsion system, where the cold regulating valve includes an open frame which delimits an opening, two shutters with an external convex shape slidably mounted on the open frame between a closed position and an open position, a mechanism linked to the shutters and mobile between a first position and a second position, and wherein the mechanism moves the shutters from the closed position to the open position when it moves from the first position to the second position and vice versa, and an actuator acting on the mechanism to move it from the first position to the second position and vice versa. The specific embodiment of the cold regulating valve generates a low drag when the shutters are in a closed position.

11 Claims, 5 Drawing Sheets

(51) Int. Cl.
*F16K 1/20* (2006.01)
*F16K 31/52* (2006.01)
*F16K 1/22* (2006.01)

(58) Field of Classification Search
CPC ........... F16K 31/5282; F16K 31/52441; F16K 31/521; F16K 1/2007; F16K 1/223; Y10T 137/87475; Y10T 137/87483; Y10T 137/87467; F02C 7/185; F02C 6/08; F02C 7/14; F02C 7/18; F01D 17/148; F01D 25/12; F02K 3/06; F02K 3/115; F24F 13/10; F24F 13/1486; F24F 2013/1433; F24F 13/15; F24F 13/16; F24F 13/1413; F05D 2260/213; B64D 33/08; B64D 13/06; B64D 2013/0618; F28F 2009/222–228; F28F 25/12; F28F 9/22; F28F 27/02
USPC ......... 251/279, 901; 454/309–321, 333–336; 49/64, 65, 68, 109, 11, 113; 60/226.1–226.3, 782, 785, 772
See application file for complete search history.

(56) References Cited

U.S. PATENT DOCUMENTS

| | | | | |
|---|---|---|---|---|
| 4,932,437 | A * | 6/1990 | Bachmann | F16K 1/223 |
| | | | | 137/601.06 |
| 4,976,466 | A * | 12/1990 | Vauchel | F02K 1/70 |
| | | | | 239/265.41 |
| 7,810,312 | B2 * | 10/2010 | Stretton | F02K 3/06 |
| | | | | 60/785 |
| 7,861,513 | B2 * | 1/2011 | Stretton | F02K 3/115 |
| | | | | 60/728 |
| 9,206,912 | B2 * | 12/2015 | Landre | B64D 13/00 |
| 10,557,416 | B2 * | 2/2020 | Zysman | F02C 7/14 |
| 11,073,300 | B2 * | 7/2021 | Koeger | F16K 1/223 |
| 2012/0056118 | A1 * | 3/2012 | Yokoyama | F02M 26/64 |
| | | | | 251/248 |
| 2018/0355739 | A1 | 12/2018 | Zysman | |

FOREIGN PATENT DOCUMENTS

EP 3106646 A1 12/2016
EP 3851659 A1 7/2021

\* cited by examiner

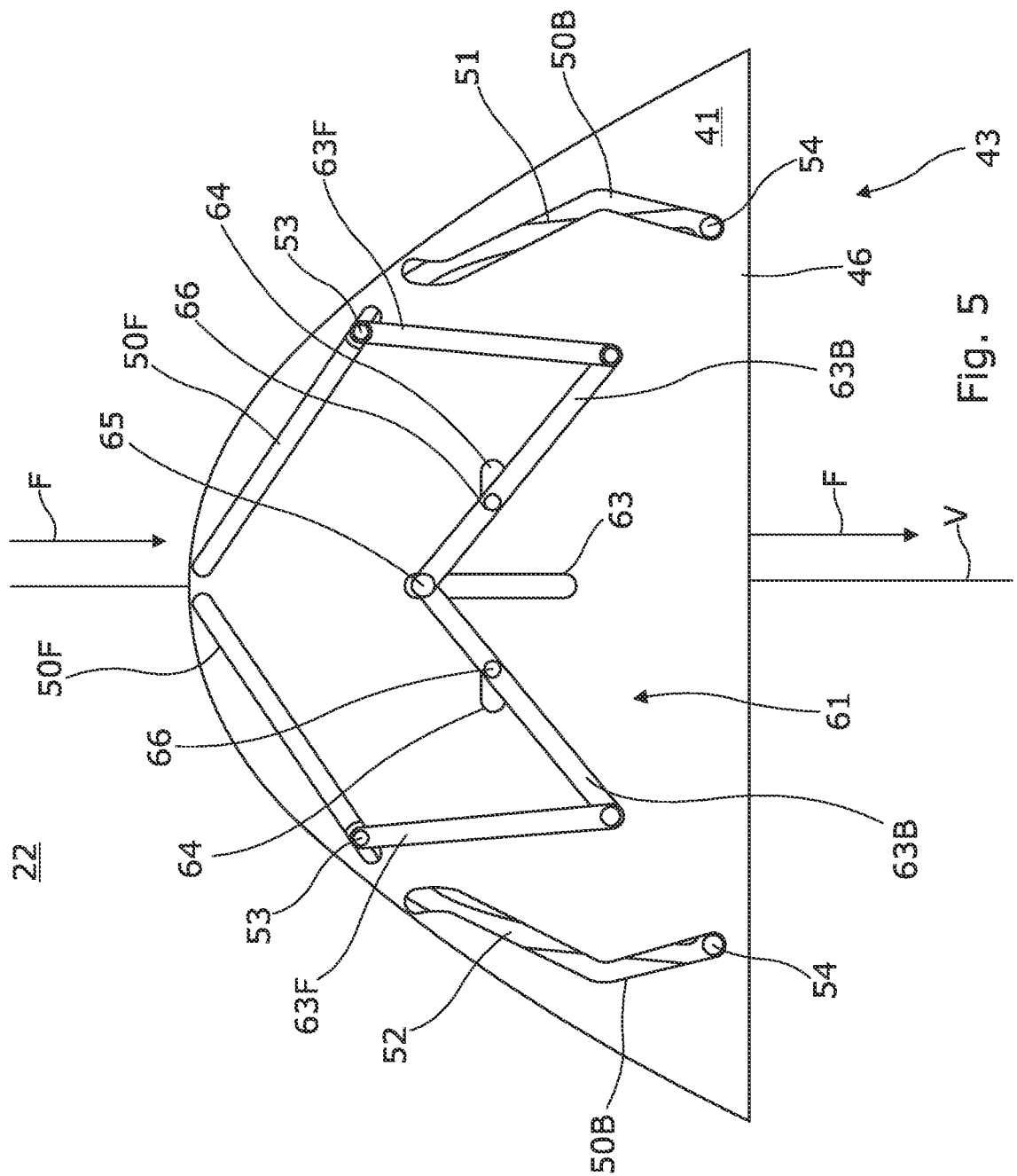

COLD REGULATING VALVE FOR A HEAT EXCHANGER SYSTEM OF AN AIRCRAFT PROPULSION SYSTEM

CROSS-REFERENCE TO RELATED APPLICATION

This application claims priority to European patent application number 20151978-2 filed on Jan. 15, 2020, the entire disclosure of which is incorporated by reference herein.

TECHNICAL FIELD

The disclosure herein relates to a cold regulating valve for a heat exchanger system of an aircraft propulsion system.

BACKGROUND

As shown in FIG. 1, a heat exchanger system 2 of an aircraft propulsion system for supplying hot air to different air management systems of the aircraft (e.g. de-icing, air-conditioning of the passenger cabin) comprises a heat exchanger 3 which is supplies with hot air through a first supply pipe 4, the latter bleeding hot air from an engine, respectively through a first valve 4a and a second valve 4b. The first supply pipe also includes a hot regulating valve 4c, which enables regulation of the pressure at the inlet of the heat exchanger 3.

The heat exchanger 3 is also supplied with cold air by a second supply pipe 5, which bleeds cold air from the fan duct of the engine. The second supply pipe 5 also includes a cold regulating valve 5a controlled by a controller 5b to regulate the quantity of cold air introduced into the heat exchanger 3 and hence to regulate the temperature of the hot air exiting the heat exchanger 3.

After having passed through the heat exchanger 3, the cold air, which has been heated, is expelled to the outside through an evacuation pipe 6 and the hot air, which has been cooled, is directed through a transfer pipe 7 to the air management systems.

The cold regulating valve 5a is usually a butterfly type valve is arranged within the fan duct of the engine. In the closed position of the flat plate, the cold regulation valve 5a of the butterfly type valve creates a closed cavity within the fan duct, hence generating a drag in the fan duct and therefore adversely affects the performance of the propulsion system.

SUMMARY

An object of the disclosure herein is to propose a cold regulating valve for a heat exchanger system of an aircraft propulsion system which generates, in a closed position, little or no additional drag in the fan duct.

To that effect, a cold regulating valve is disclosed for a heat exchanger system of an aircraft propulsion system.

BRIEF DESCRIPTION OF THE DRAWINGS

The aforementioned characteristics of the disclosure herein, as well as others, will emerge more clearly on reading the following description of an embodiment example, the description being made in relation to the attached drawings, among which:

FIG. 5 is the same view as FIG. 4 in an open position of the cold regulating valve.

DETAILED DESCRIPTION

Figure 1:
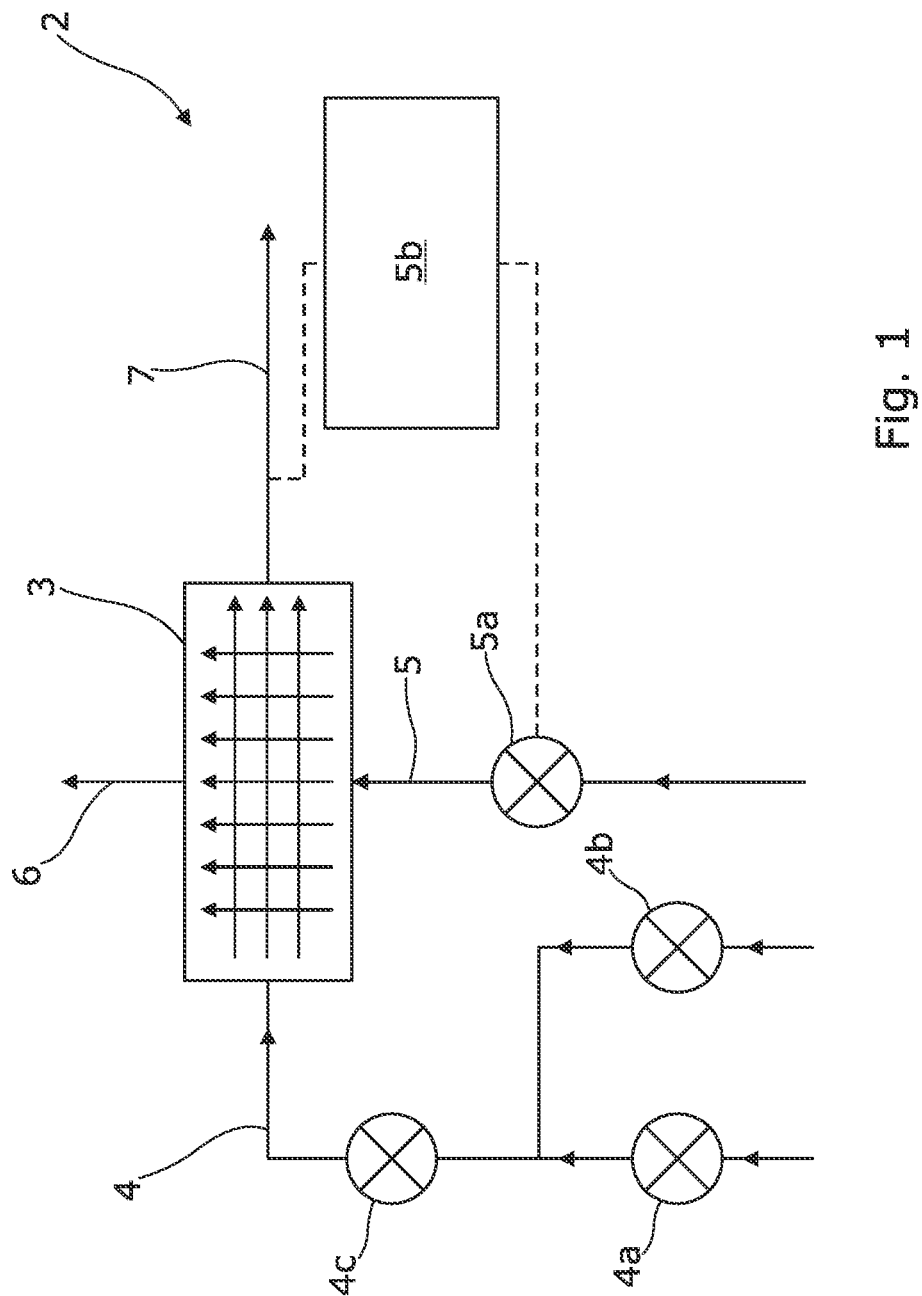
FIG. 1 is a schematic illustration of a heat exchanger system comprising a cold regulation valve according to the prior art.
Figure 2:
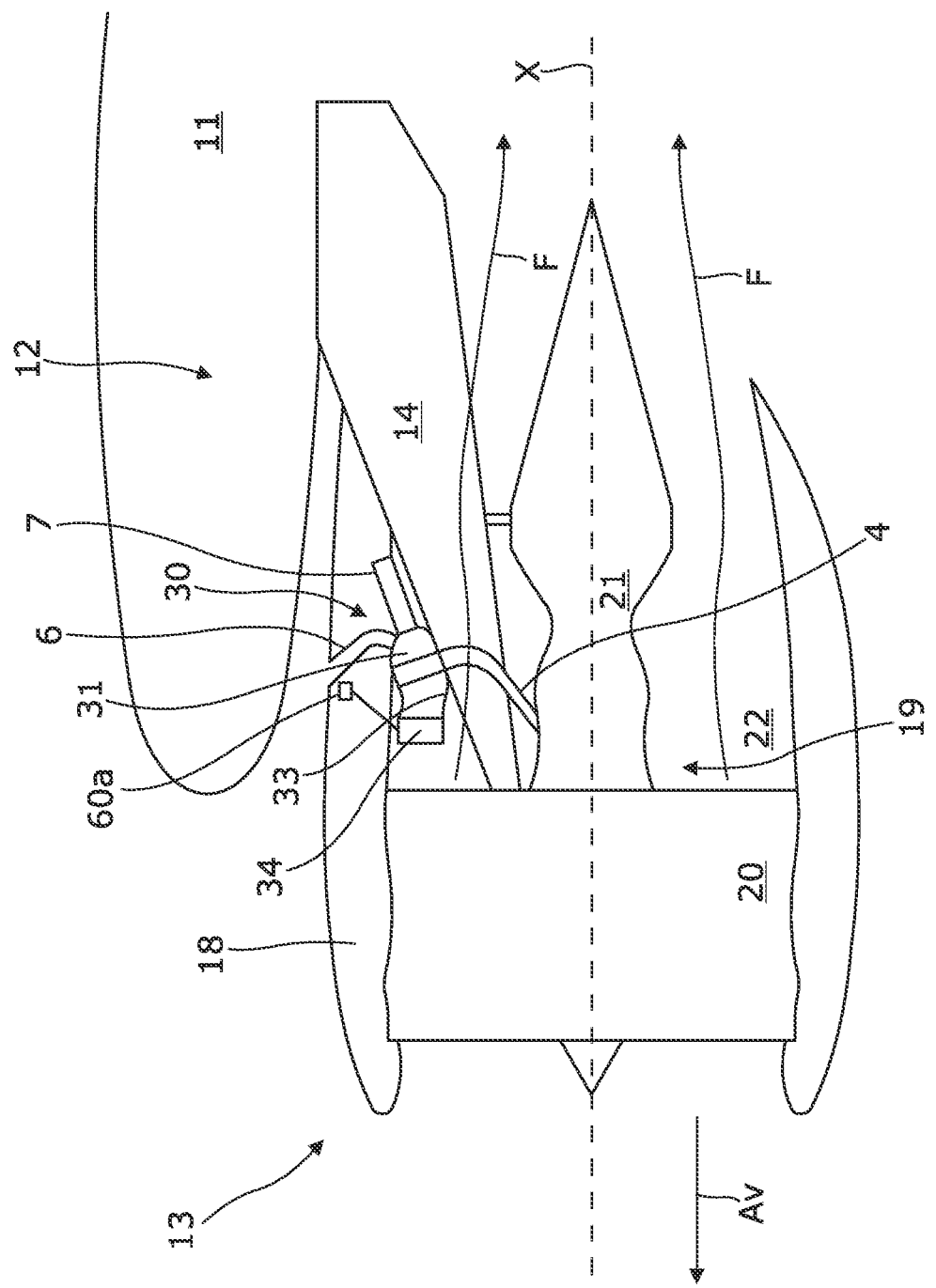
FIG. 2 shows a section view of a propulsion system attached under the wing of an aircraft and comprising a heat exchanger system with a cold regulating valve according to the disclosure herein.

In relation to FIG. 2, a propulsion system 12 of an aircraft comprises a dual flow turbojet engine 12 and a pylon 14 which is attached at tis upper part to the structure of the wing 11 of the aircraft (not shown) and its lower part of the turbojet engine 13.

In the description that follows, the terms relating to a position are taken with reference to the arrow Av representing the direction of advance of the wing 1 in the air under the thrust provided by the turbojet engine 13.

The turbojet engine 13 comprises an annular nacelle 18 surrounding an engine 19 which comprises, from front to rear of the nacelle 19 along the longitudinal axis X of the nacelle, a fan 20 and then an engine body 21 for driving the fan.

The turbojet engine 13 comprises, rearwards of the fan 20, an annular fan duct 22 defined between the nacelle 18 and the engine 19. An airflow F expelled by the fan 20 is guided throughout the fan duct 22 length, and is ejected at the rear of the turbojet engine 13.

The pylon 14 is disposed above the engine body 21 and is partially immersed into the fan duct 22.

The propulsion system 12 comprises a heat exchanger system 30 which includes a heat exchanger 31 arranged within the fan duct 22. The heat exchanger system 30 has the same architecture than the heat exchanger system of the prior art but the cold regulating valve, arranged within the fan duct 22, has a different design that will be described in details below.

Figure 3:
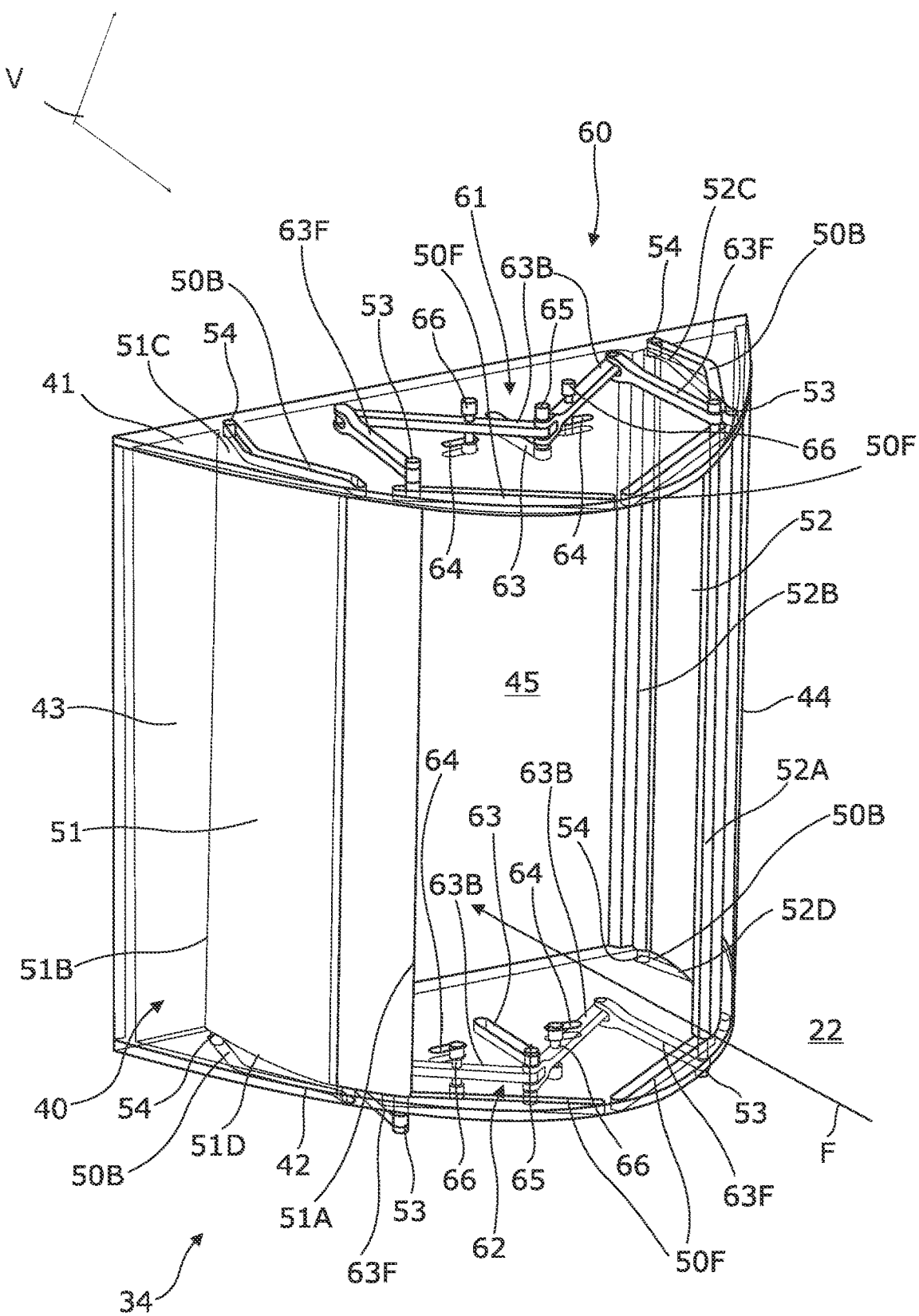
FIG. 3 is a perspective view of a cold regulating valve of FIG. 2 according to the disclosure herein.
Figure 4:
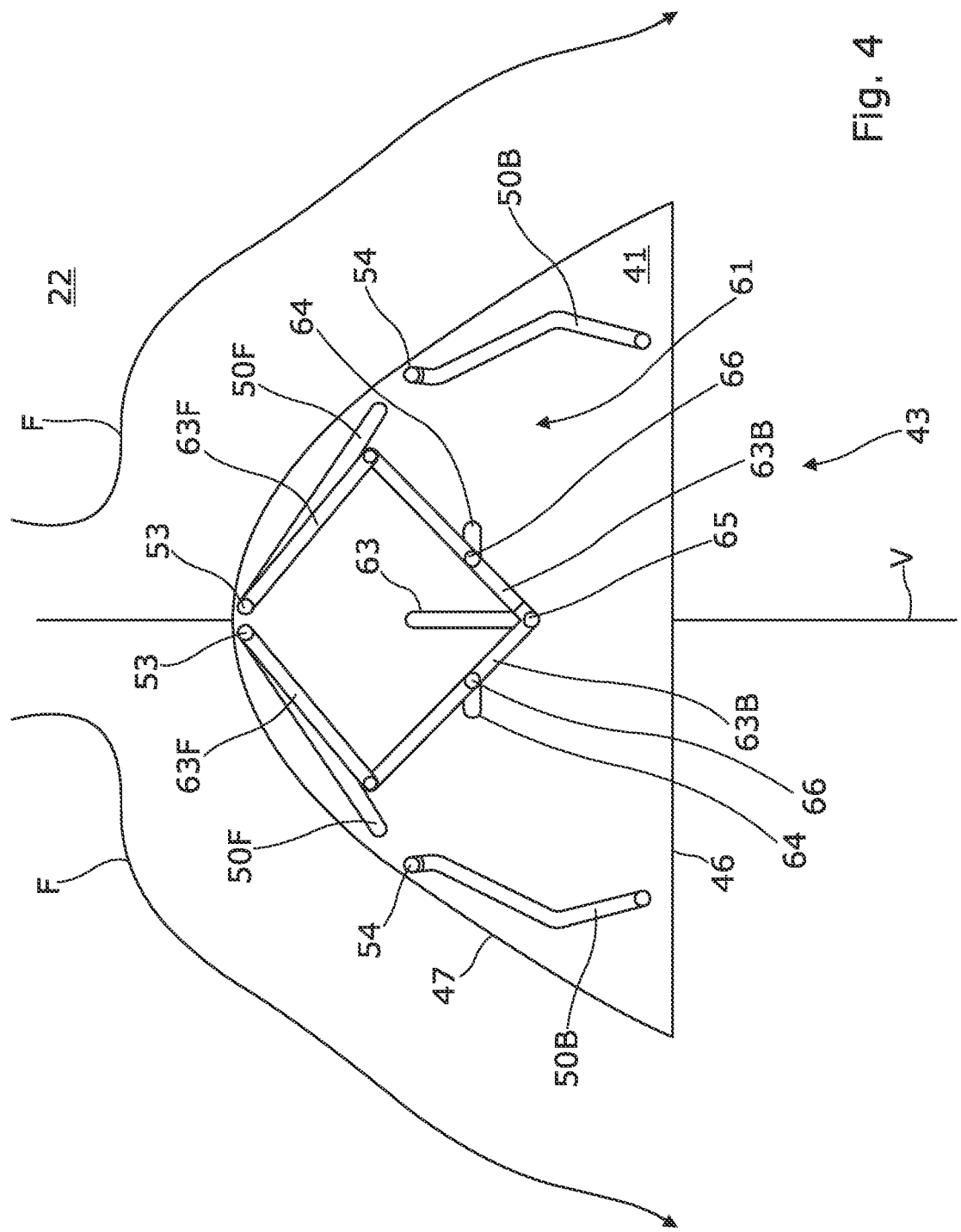
FIG. 4 is a top view of the cold regulating valve of FIG. 3, wherein the cold regulating valve is in a closed position.

As represented in FIGS. 3 through 5, the cold regulating valve 34 according to the disclosure herein includes an open frame 40. The open frame 40 has substantially a half-cylindrical shape consisting of or comprising a lower 42 and upper 41 walls joined together by two curved side calls 43, 44. The lower and upper wall 41, 42 are identical to each other and substantially have a half-circle shape, with a straight edge 46 at a front side of the open frame 40 and an arched edge 47 at the back side of the open frame 40. The walls 41-44 delimit together an opening 45 extending from the front side and the back side of the open frame 40.

The cold regulated valve 34 is an operating position on-board an aircraft on the ground, the open frame 40 is arranged between the pylon 14 and the nacelle 18, with its upper and lower wall 41, 42 substantially parallel to the ground, and has its front side oriented towards the front of the fan duct 22 and its back side orientated towards the rear of the fan duct 22.

The cold air flow (arrow F) which flows through the opening 45 arrives in a supply pipe 33 that connects the cold regulating valve 34 to the heat exchanger 31. The walls of the supply pipe 33 extend the walls 41-44 of the open frame 40 in order that the cold air of the fan duct 22 which flows through the opening 45 arrives in the heat exchanger 31 without losses.

The open frame 40 can be fixed directly to the second supply pipe 33 thanks to known fixation by, or to another structure such as the nacelle 18 or the mast 15.

The cold regulating valve 34 includes also two shutters 51, 52 (the open frame 40 is shown in transparency on FIG. 3). Each shutter 51, 52 comprises a front edge 51a, 52a and a rear edge 51b, 52b, joined together by an upper edge 51c, 52c and a lower edge 51d, 52d. Each shutter 51, 52 comprises pins 53, 54 inserted into guidance tracks 50 arranged in the upper and lower walls 43, 44 of the open frame 40. The housing of the pins 53, 54 into the guidance tracks 50 enable guidance of the shutter 51, 52 along the path defined by the guidance tracks 50.

The guidance tracks 50 consist of or comprise elongated holes arranged along the arched edge 47 of the upper and lower walls 43, 44 and distributed symmetrically on each side of the vertical plane V of the open frame 40.

The vertical plane V is the plane which divides the open frame 40 into two symmetrical left and right parts, which is parallel to a longitudinal axis of the open frame 40, extending between its front side and its back side. When the cold regulating valve 34 is in operating position, the longitudinal axis of the open frame is parallel to the longitudinal axis X of the nacelle 18.

The pattern of the elongated holes forming the guidance tracks 50 are designed so that the shutters 51, 52 are mobile between a closed position (FIG. 4: which corresponds to the closed position of the cold regulating valve) in which each shutter 51, 52 closes half of the opening 45, and an open position (FIG. 5: which corresponds to the open position of the cold regulating valve) in which each shutter 51, 52 is retracted in order to open half of the opening 45. Intermediate positions are possible between the open position and the closed position. The upper wall 41 is shown in transparency on FIGS. 4 and 5.

In the closed position, the front edge 51a, 52a of the shutters 51, 52 are in contact one from the other to cover the opening 45. In the open, the front ends 51a, 52a of the shutters 51, 52 are away of the other to free the opening 45. Between its front edges 51a, 52a and its back edge 51b, 52b, each shutter presents an external convex face. When the shutters are in their closed position, the cold air flow F coming from the fan duct 22 is deflected by the external convex faxes of the shutters 51, 52 and does not enter into the open frame 40. The convex shape is designed to reduce the drag induced by the cold regulating valve 34 arranged within the fan duct 22 when the shutters 51, 52 are in the closed position.

In the embodiments detailed in the FIGS. 3 through 5, each shutter comprises front pins 53 arranged on its lower and its upper edges 51c-d, 52c-d at the front end 51a, 52a and the back pins 54 arranged on its lower and on its upper edges 51c-d, 52c-d at the back end 51b, 52b. For both the upper and lower wall 41, 42 on each side of the vertical plane V, and symmetrically to this plane V, there is a pair of guidance tracks 50, with a front guidance track 50F and a back guidance track 50B located at the rear of the front guidance track 50F. The front guidance track 50F is formed by an elongated hole with a straight pattern whereas the back guidance 50B track is formed by an elongated hole with a zigzag pattern. These particular patterns enable the fitting of the shutters 51, 52 within the shapes of the side walls despite their convex shape.

At the level of each of the upper and the lower walls 41, 42, and on each side of the vertical plane V, the fronts pins 53 of a shutter 51, 52 are inserted into the front guidance track 50F and the back pins 54 of the shutter 51, 52 are inserted into the back guidance tracks 50B.

The cold regulating valve 34 includes also a mechanism for moving the shutters 60 which is linked to the shutters 51, 52. The mechanism for moving the shutters 60 is mobile between a first position corresponding to the closed position of the shutters 51, 52 and a second position corresponding to the open position of the shutters 51, 52.

The mechanism for moving the shutters 60 is comprised of two identical sets of rods 61, 62 with one arranged on the lower wall 42 and the other on the upper wall 41. Each set of rods 61, 62 comprises rods 63F, 63B articulated between them and that are arranged outside of the opening 45. Each set of rods 61, 62 is located at the back of the shutters 51, 52 in their closed position and between the shutters 51, 52 in their open position.

In the embodiment detailed in the FIGS. 3 through 5, each set of rods 61, 62 comprises four articulated rods 63F-B, with two rods on each side of the vertical plane V, i.e. a front rode 63F and a back rod 63B, dedicated to the movement of a shutter 51, 52.

Both upper and lower walls 41, 42 comprise a longitudinal track 63 formed by an elongated hole having a straight pattern and arranged parallel to the vertical plane V. Both upper and lower walls 41, 42 comprise also two transverse tracks 64, each formed by an elongated hole having a straight pattern that are arranged perpendicular to the vertical plane V. The two transverse tracks 64 are symmetrically distributed on each side of the longitudinal track 63.

Identically on each side of the vertical plane V and on each of the upper and lower walls 41, 42, the front rod 63F has a first end articulated to the front pin 53 of a shutter 51, 52 and a second end articular to the first end of the back rod 63B. The second end of the back rod 63B is articulated to an axis 65 housed into the longitudinal track 63. In order to ensure an adequate kinematics that allows movement of the shutters 51, 52 the back rode 63B also comprises a pin houses into the transverse track 64.

An actuator 60a (see FIG. 3) acts on the mechanism for moving the shutter 60. The actuator 60a is mechanically linked to the axis 65 of the set of rods 61 arranged on the upper wall 41. Actuation causes a translation of the axis 65 along the longitudinal track 63. Because of the kinematic chain described, the movement of the axis 65 of the set of rods 62 arranged on the lower wall 42 is identical to that of the axis 65 of the set linked to the actuator 60a.

As the movement of the axis 65 is a translation and not a rotation, the actuator 60a can be moved away from the axis 65, and especially, it can be set backwards in respect to the cold regulating valve 34 avoiding the disturbance of the air flow F in the fan duct 22.

As illustrated in FIGS. 4 and 5, when the shutters 51, 52 are in closed position, the axis 65 of each set of rods 61, 62 abuts against a rear end of the longitudinal track 63, while the front pins 53 of the shutters 51, 52 abut against the front end of the front guidance tracks 50F and the back pins 54 abut against the front end of the back guidance tracks 50B.

To move the shutters 51, 52 towards their open position, the actuator 60a moves the axis 65 toward the front end of the longitudinal track 63. The movement of the axis 65 toward the front end of the longitudinal track 63 causes a translation of the front pins 53 and the back pins 54 of the shutters towards the rear ends of the front guidance tracks 50F and, respectively, back guidance tracks 50B.

The open position of the shutters 51, 52 is reached when the axis 65 abut against the front end of the longitudinal track.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" by means of either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cold regulating valve for a heat exchanger system of an aircraft propulsion system, the cold regulating valve comprising:
    an open frame that delimits an opening and comprises:
        upper and lower walls joined together by two side walls; and
        a plurality of guidance tracks, which arranged in an identical manner on the upper wall and on the lower wall;
    two shutters extending between a front end and a rear end, a respective one of the two shutters being on each side of a vertical plane which divides the open frame into two symmetrical left and right parts, each of the two shutters being slidably mounted on guidance tracks and mobile between a closed position, in which each of the two shutters closes a half of the opening, and an open position, in which each of the two shutters is retracted in order to open the half of the opening, wherein each of the two shutters, between the front end and the rear end thereof, respectively, presents an external convex face;
    a mechanism linked to the two shutters and configured for moving the two shutters, wherein the mechanism is mobile between a first position and a second position, and wherein, when moving from the first position to the second position, the mechanism moves the two shutters from the closed position to the open position, respectively, and, when moving from the second position to the first position, the mechanism moves the two shutters from the open position to the closed position, respectively; and
    an actuator configured to act on the mechanism to move the mechanism from the first position to the second position and/or from the second position to the first position.

2. The cold regulating valve according to claim 1, wherein the open frame has a substantially half-cylindrical shape.

3. The cold regulating valve according to claim 1, wherein the mechanism comprises two identical sets of rods, with a first set on the upper wall and a second set arranged on the lower wall.

4. The cold regulating valve according to claim 3, wherein the two shutters each comprise, at both front and rear ends and on each of two opposite edges thereof, front pins arranged at the front edge thereof and back pins arranged at the rear edge thereof, the front and back pins being inserted into the guidance tracks of the upper and lower walls.

5. The cold regulating valve according to claim 4, wherein, on each side of the vertical plane, each of the upper and lower walls comprises a front guidance track for housing the front pins and a back guidance track located at a rear of the front guidance track for housing the back pins.

6. The cold regulating valve according to claim 5, wherein the front guidance track is an elongated hole with a straight pattern and the back guidance track is an elongated hole with a zigzag pattern.

7. The cold regulating valve according to claim 4, wherein each one of the upper and lower walls comprises:
    a longitudinal track of the plurality of guidance tracks, the longitudinal track being formed by an elongated hole having a straight pattern arranged parallel to the vertical plane; and
    two transverse tracks of the plurality of guidance tracks, each of the two transverse tracks being formed by an elongated hole having a straight pattern, the two transverse tracks being arranged perpendicular to the vertical plane and symmetrically distributed on each side of the longitudinal track.

8. The cold regulating valve according to claim 7, wherein each set of rods comprises rods articulated between them and to the two shutters, the rods being arranged outside the opening.

9. The cold regulating valve according to claim 8, wherein said each set of rods comprises four articulated rods, with on each side of the vertical plane, a front rod and a back rod.

10. The cold regulating valve according to claim 9, wherein:
    on each side of the vertical plane, the front rod has a first end articulated to a front pin of a corresponding one of the two shutters and a second end articulated to a first end of the back rod;
    the second end of the back rod is articulated to an axis housed in the longitudinal track; and
    the back rod comprises a pin housed in one of the two transverse tracks.

11. The cold regulating valve according to claim 10, wherein the actuator is mechanically linked to the axis housed in the longitudinal track of the upper wall.

* * * * *